United States Patent [19]

Scully

[11] Patent Number: 5,256,849
[45] Date of Patent: Oct. 26, 1993

[54] APPARATUS AND METHOD FOR MAKING AND USING HIGH INDEX OF REFRACTION MATERIALS

[75] Inventor: Marlan O. Scully, Irving, Tex.
[73] Assignee: Biolight, Inc., Tucson, Ariz.
[21] Appl. No.: 771,397
[22] Filed: Oct. 3, 1991
[51] Int. Cl.$^5$ ............................................. B23K 26/00
[52] U.S. Cl. ............................ 219/121.68; 219/121.69
[58] Field of Search ....................... 219/121.68, 121.69

[56] References Cited

U.S. PATENT DOCUMENTS

| 4,119,362 | 10/1978 | Holzman | 350/96.18 |
| 4,597,638 | 7/1986 | Chemla et al. | 350/354 |
| 4,772,774 | 9/1988 | Lejeune et al. | 219/121.69 |

OTHER PUBLICATIONS

Born; *Principles of Optics: Electromagnetic Theory of Propagation*; 6th Edition; Pergamon Press (1980).
Klein; *Optics*, 2nd Edition; J. Wiley & Sons (1986).
Sargent; *Laser Physics*; Addison-Wesley Publishers (1974).
Fleischhauer, M., et al., "Resonantly Enhanced Refractive Index Without Absorption Via Atomic Coherence" *The American Physical Society*, pp. 1468-1487 (1992).
Scully, M. O., "Enhancement of the Index of Refraction via Quantum Coherence", *Amer. Physical Society*, pp. 1855-1858 (1991).
Shay; *400 Hz Frequency Stability of a GaAlAs Laser Frequency Locked to the Rb (D2) line;* Optical Engineering, vol. 29, No. 6, pp. 681-683 (1990).
Imamoglu; *Interference of Radiatively Broadened Resonances;* Physical Review A, vol. 40, No. 5, pp. 2835-2838 (1989).
Harris, et al.; *Nonlinear Optical Processes Using Electromagnetically induced Transparency;* Physical Review Letters, vol. 64, No. 10, pp. 1107-1110 (1990).
Basile, et al.; *Radiation Amplification Without Population Inversion in Discrete Three-Level Systems;* Optics Communications, vol. 78, No. 2, pp. 163-168 (1990).
Harris; *Lasers Without Inversion: Interference of Lifetime-Broadened Resonances;* vol. 62, No. 9; pp. 1033-1036; (1989).
Scully, et al; *Degenerate Quantum-Beat Laser: Lasing without Inversion and Inversion without Lasing;* Physical Review Letters; vol. 62, No. 24; pp. 2813-2816 (1989).
Winters, et al.; *Correlated Spontaneous Emission in a Zeeman Laser;* Physical Review Letters, vol. 65, No. 25, pp. 3116-3119 (1990).

*Primary Examiner*—C. L. Albritton
*Attorney, Agent, or Firm*—Dennis F. Armijo; Donovan F. Duggan; Deborah A. Peacock

[57] ABSTRACT

Method and apparatus for increasing the index of refraction, n, by several orders of magnitude. Pumping and probing radiation excite the various atomic levels of a material, and establish coherence between such levels. Index of refraction can thereby be increased while, concomitantly, absorbence of the material is minimized.

19 Claims, 8 Drawing Sheets

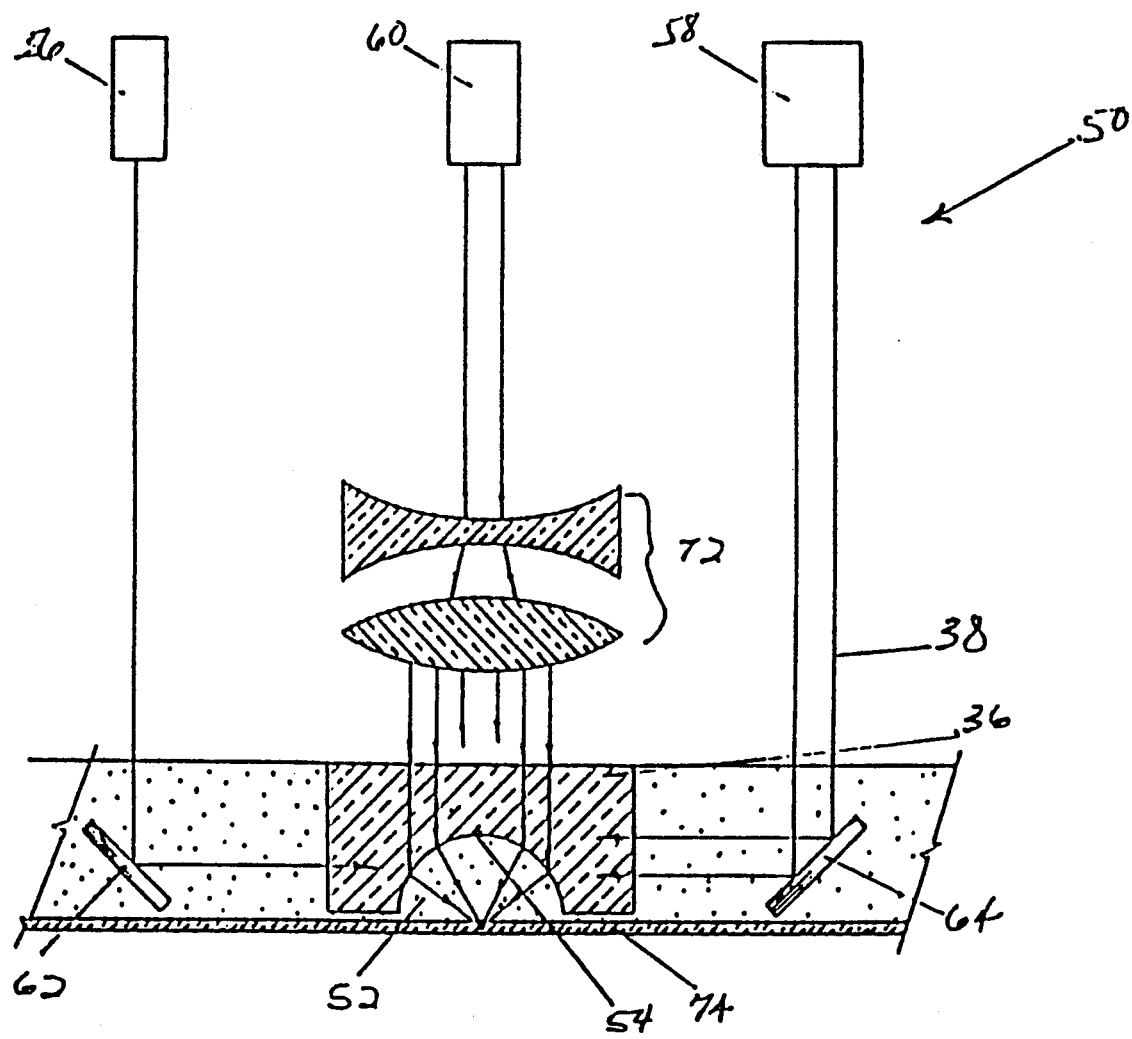
FIG—7

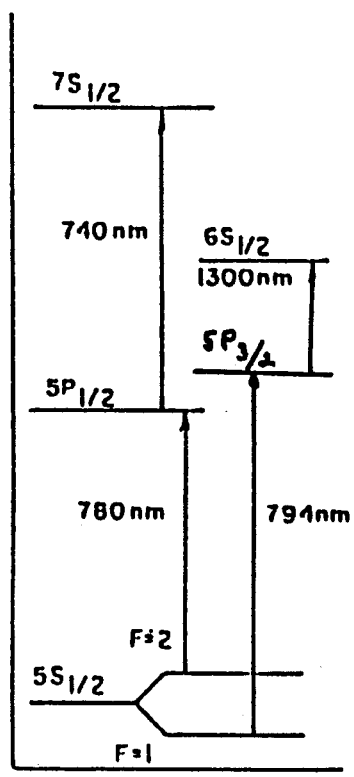
FIG — 8
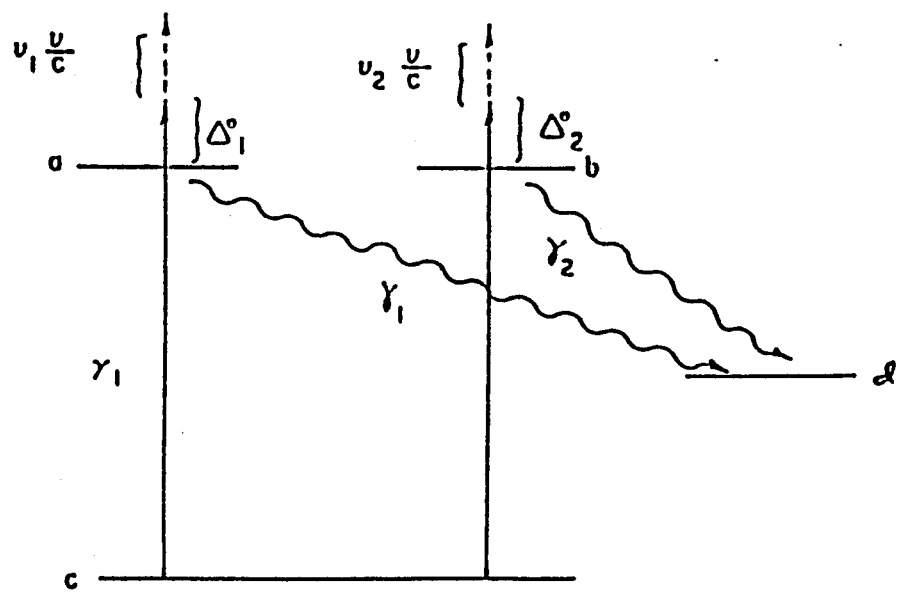
FIG — 9

APPARATUS AND METHOD FOR MAKING AND USING HIGH INDEX OF REFRACTION MATERIALS

FIELD OF THE INVENTION (TECHNICAL FIELD)

The invention relates to an apparatus and method for making and using high index of refraction materials.

BACKGROUND ART

As is well known (B. Born and E. Wolf, *Principles of Optics* (Pergamon Press, Oxford, 1980)), the resolving power of a microscope or optical lithographic system is determined by the numerical aperture, N.A., and the wavelength $\lambda$ of light used, that is $$\text{resolving power} \approx \frac{N.A.}{\lambda},$$

where the numerical aperture $N.A. = n \sin \theta$, the angle $\theta$ is the collection angle subtended by the lens, $\mu$ = wavelength, and n is the index of refraction of the medium in which the lens is immersed.

In the prior art, efforts directed toward increasing resolution have focused on using shorter wavelength radiation. However, this presents obvious difficulties, for example, in the use of ultraviolet and X-ray optics, the ionization produced by such short wavelength radiation, and the like.

As an alternative to using shorter wavelength radiation, resolution can be enhanced by increasing the numerical aperture (Id.). This is the principle of the oil immersion microscope, in which the sample to be studied is essentially immersed in oil in order to increase n. However, since $1.0 < n < 1.5$, the numerical aperture can at most be around 1.5, and thus only a modest increase in resolution is achieved.

It has long been known, however, that the index of refraction, n, can be made large by working in the neighborhood of an optical resonance. However, dispersion-absorption relations state that the absorption of the light will be overwhelming when the resonant index of refraction is large. The real part of the polarization (which governs the index of refraction n) is large where the detuning frequency $\Delta = \gamma$ (decay rate) but the absorption is also large at this point.

However, it is possible to obtain a large index of refraction n without large absorption. This is accomplished via the "atomic diode" concept herein disclosed in which atoms emit light but do not absorb. As such, the atomic diode concept is an extension of the "nonabsorbing" or "dark states" of matter first observed in the 1970's. That work demonstrated that it is possible to produce such nonabsorbing states of matter via quantum interference and atomic coherence. These ideas form the basis of current research involving lasers which operate without population inversion (S. Harris, Phys. Rev. Lett. 62, 1022 (1989); M. Scully, S. Zhu, and A Gavrieliedes, Phys. Rev. Lett. 62, 2813 (1989)); and have been observed in "Nonabsorption Resonance" experiments (G. Alzetta, A. Gozzini, L. Moi and G. Orriols: Nuovo Cimento 36B, 5 (1976); G. Alzetta in *Coherence in Spectroscopy and Modern Physics*, edited by F. T. Arecchi, R. Bonifacio and M. O. Scully (New York, N.Y., 1978); G. Alzetta, L. Moi and G. Orriols, Nuovo Cimento 52B, 209 (1979)) and "Electromagnetically Induced Transparency" experiments (K. Boller, A. Imamoglu, and S. Harris, "Observation of Electromagnetically Induced Transparency," Phys. Rev. Lett., to be published).

Laser radiation has been injected into a sodium vapor cell and the scattered resonant radiation observed. It was found that, under certain conditions, the atoms did not absorb the laser radiation. This state of gas was called "nonabsorption resonance."

More recently, optically thick media has been rendered transparent by applying a laser to excited atomic states so as to induce a destructive interference.

The present disclosure indicates that it is possible to generate a medium in which there is a large index of refraction, n, and a vanishingly small absorption.

SUMMARY OF THE INVENTION (DISCLOSURE OF THE INVENTION)

The present invention relates to a method of making a material having a high index of refraction. The method comprises irradiating a composition of matter and thereby establishing coherence between the various energy levels of the composition of matter, and minimizing the absorbence of the composition of matter.

One can irradiate the composition of matter and thereby establish coherence between the various energy levels of the composition of matter by several methods, such as illuminating the composition of matter with resonant laser radiation, providing a microwave driving field, providing Raman-induced coherence, and the like.

The absorbance of the composition of matter can be minimized by selecting a detuning frequency, selecting an intensity of pumping radiation, and the like.

The method of the invention may further comprise observing an object within the high index of refraction material, and etching an object within the high index of refraction material.

The invention further relates to an apparatus and method for etching semiconductor wafers and the like. The invention comprises a photolithography apparatus comprising a support for supporting a semiconductor wafer to be etched, and containing a high index of refraction material; and irradiating the high index of refraction material, whereby the index of refraction of the high index of refraction material is increased by several orders of magnitude.

The invention further relates to an apparatus for high resolution observation of an object. The apparatus comprises a microscope comprising an eyepiece, barrel, and objective lens system. The objective lens system comprises a stage supporting the object to be observed and a high index of refraction material, whereby high resolution observation of the object is increased by orders of magnitude.

The high index of refraction material may be contained within and flow through a conduit, such as a semi-cylindrical conduit.

The high index of refraction material may be irradiated by pump radiation, coherence radiation, illuminating radiation, or the like. The high index of refraction material preferably comprises rubidium (Rb) vapor, sodium (Na) vapor, carbon dioxide, or the like.

The invention further relates to a method of etching semiconductor material. The invention comprises providing a conduit over an area to be etched; positioning high index of refraction material within the conduit; and irradiating the high index of refraction material while focusing illuminating radiation upon the area to be etched. The high index of refraction material preferably flows through the conduit. The high index of refraction material may be irradiated by directing a plurality of pump radiation beams upon the high index of refraction material, or by directing coherent radiation upon the high index of refraction material.

The invention further relates to a method of observing an object comprising providing a microscope comprising an objective lens system including a stage; mounting a conduit upon the stage; positioning an object to be observed within the conduit; and irradiating while positioning (preferably flowing through) high index of refraction material within the conduit, whereby the resolving power of the microscope is increased by several orders of magnitude. The high index of refraction material may be irradiated by directing a plurality of pump radiation beams upon the high index of refraction material, or by directing coherent radiation upon the high index of refraction material.

An object of the invention is the provision of a material with an index of refraction several orders of magnitude higher than heretofore known.

Another object of the invention is the provision of a material in which the index of refraction is maximized while absorbance is minimized.

Yet another object of the invention is the provision of a microscope with extremely high resolution.

Still another object of the invention is the provision of photolithography apparatus and method with vastly enhanced etching capability.

An advantage of the invention is its applicability to many known materials.

Another advantage of the invention is its ease of retrofitting to known apparatus.

Other objects, advantages, and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention.

FIG. 7 is an alternative apparatus of the invention; and

FIG. 8 is an energy level diagram of applied radiation and energy levels of the FIGS. 6 and 7 embodiments; and FIG. 9 illustrates the canceling of Doppler effects for degenerate upper state doublet when $\nu_1 = \nu_2$.

DESCRIPTION OF THE PREFERRED EMBODIMENTS (BEST MODES FOR CARRYING OUT THE INVENTION)

Figure 1:
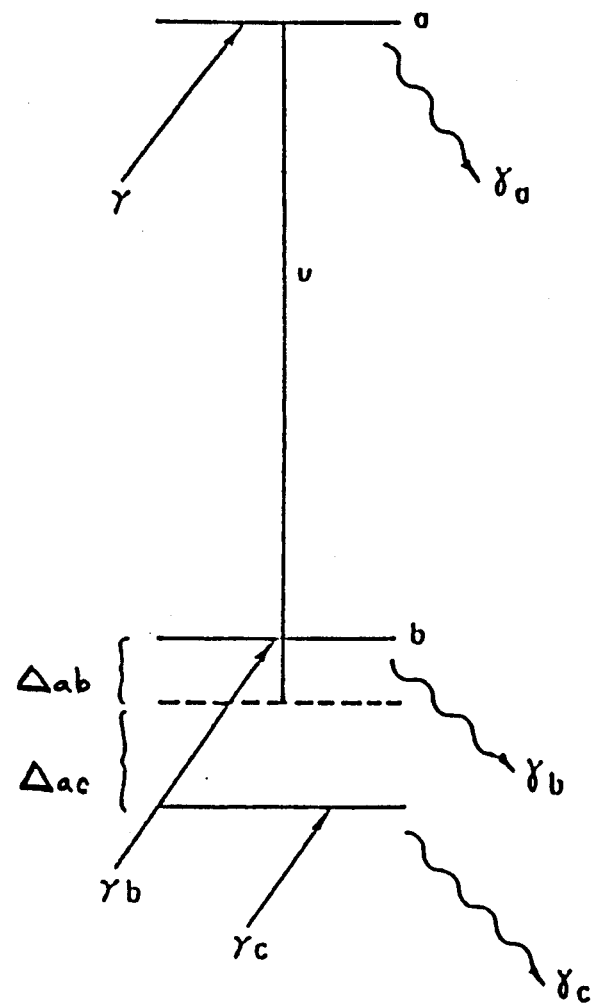
FIG. 1 is an energy level diagram of a lower level doublet.

Reference is now made to the drawings which illustrate the preferred embodiment of the invention. The ground state or lower level doublet configuration is depicted in FIG. 1. In such a case, the complex polarization, P, associated with the atomic transitions b→a and c→a is given by $$P = \Sigma_i \rho_{ib} \rho_{ab}{}^i + \rho_{ac} \rho_{ac}{}^i$$

where $\rho_{ab}$ and $\rho_{ac}$ are the transition matrix elements and $\rho_{ab}{}^i$ and $\rho_{ac}{}^i$ are the density matrix elements between the a and b and the a and c levels for the ith atom, respectively. Gas atoms are prepared in a coherent superposition state, for example, by coherent laser excitation, microwave mixing, or Raman induced coherence and the like.

In FIG. 1, the rates of excitation to the a, b, and c levels are designated by $r_a$, $r_b$, and $r_c$, the decay rate out of these levels is likewise designated by $\gamma_a$, $\gamma_b$, and $\gamma_c$. The detuning $$\Delta_{ab} = \omega_{ab} - \nu$$

and $$\Delta_{ac} = \omega_{ac} - \nu$$

where $\omega_{ab}$ is the atomic frequency difference between levels a and b, and $\omega_{ac}$ is the corresponding atomic frequency difference between levels a and c, while $\nu$ is the laser or optical frequency.

Figure 2:
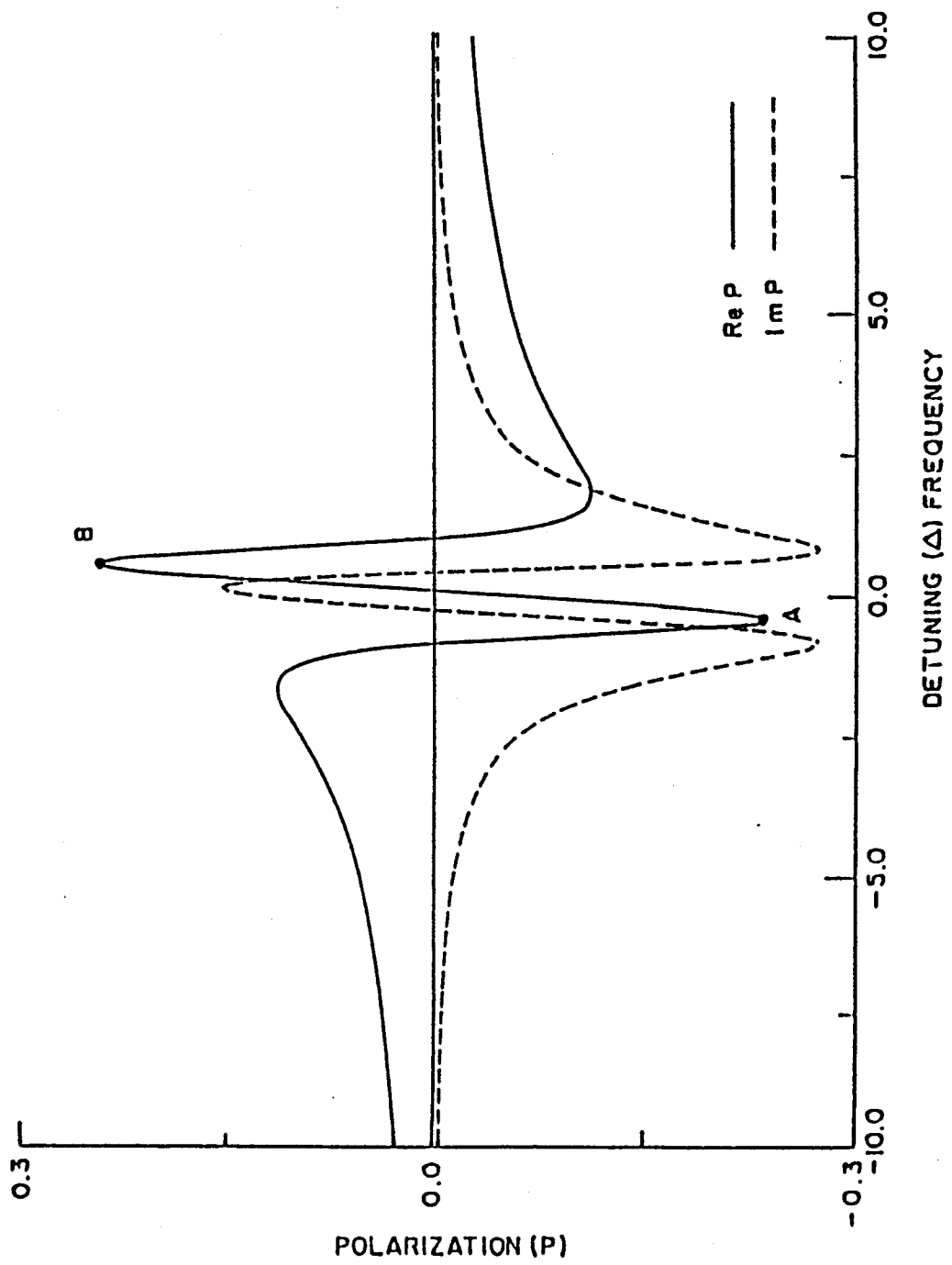
FIG. 2 is a plot of real and imaginary polarizations and detuning frequencies of the lower level doublet of FIG. 1.

FIG. 2 depicts a medium prepared in the above specified manner wherein there is a large index of refraction (the real part of the complex polarization, ReP) and no absorption (the vanishing imaginary part of the complex polarization, ImP). FIG. 2 shows the maxima of ReP near the zeros of ImP. This further indicates that the atomic diode concept can yield a high index of refraction.

In FIG. 2, points A and B are the points which correspond to vanishing absorption and also happened to show very large dispersion at those points. The detuning $\Delta$ is the average detuning between $\Delta_{ab}$ and $\Delta_{ac}$.

$$\Delta = \frac{\Delta_{ab} + \Delta_{ac}}{2}$$

Coherence between levels b and c is not difficult. For example, coherence was produced in sodium vapor when illuminated by resonant laser radiation; an Ar+ pump laser excites a tunable dye-laser which is tuned to the sodium $D_1$ line. As another example, coherence has been established on the Zeeman split sublevels of the 653.3 nm line of a HeNe laser by a microwave driving field rather than the Raman technique.

Figure 3:
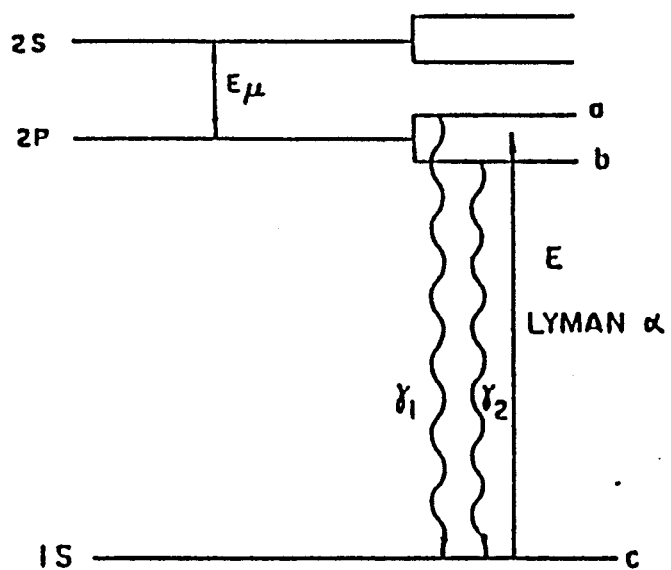
FIG. 3 is an energy level diagram of an upper level doublet.

FIG. 3 depicts the case of an upper level doublet. Again, complex polarization is given by the sum of the polarizations associated with the two transitions, which in this case are a→c, and b→c, that is $$P = \sum_i p_1 \cdot p_{ac}^i + p_2 \cdot p_{bc}^i.$$

where $p_1 = p_{ac}$ and $p_2 = p_{bc}$. There are many possible schemes for achieving an ultra-refractive medium with no absorption similar to the lower level doublet. For example, levels a and b could be coupled by microwaves as in FIG. 1, or the doublet could be allowed to decay to a common final state.

Figure 4:
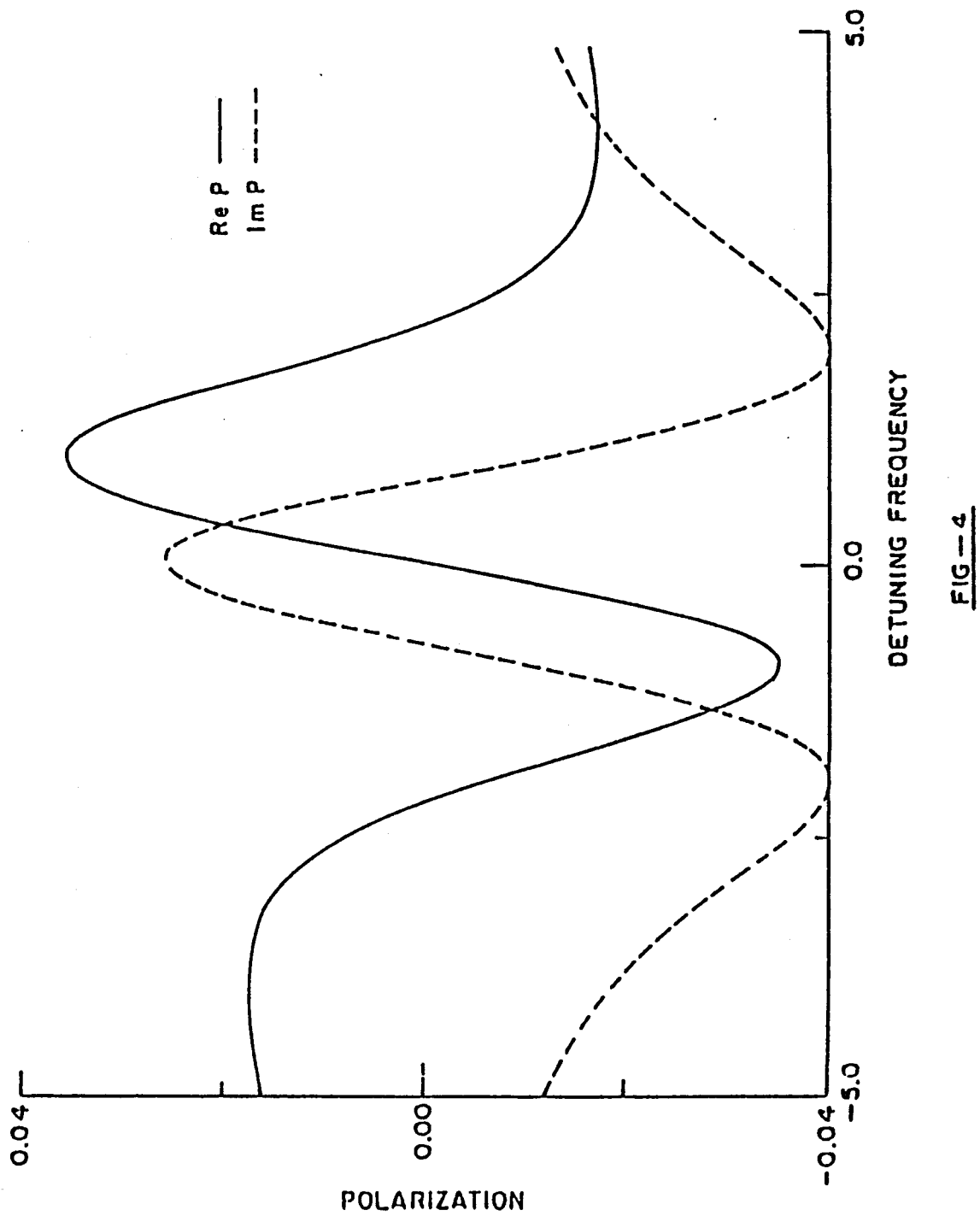
FIG. 4 is a plot of real and imaginary polarizations and detuning frequencies of the upper level of FIG. 3.

In FIG. 3, the 1s, 2s, and 2p levels of hydrogen are coupled by the usual Lyman α ultraviolet radiation in which the field corresponding to that frequency is designated E. The field joining the 2s and 2p excited states of hydrogen is designated Eµ and the decay rates from the a and b levels so chosen are designed at $\gamma_1$ and $\gamma_2$. Similarly to the lower level doublet, a large index of refraction n with vanishing absorption is possible, as depicted in FIG. 4.

Figure 5:
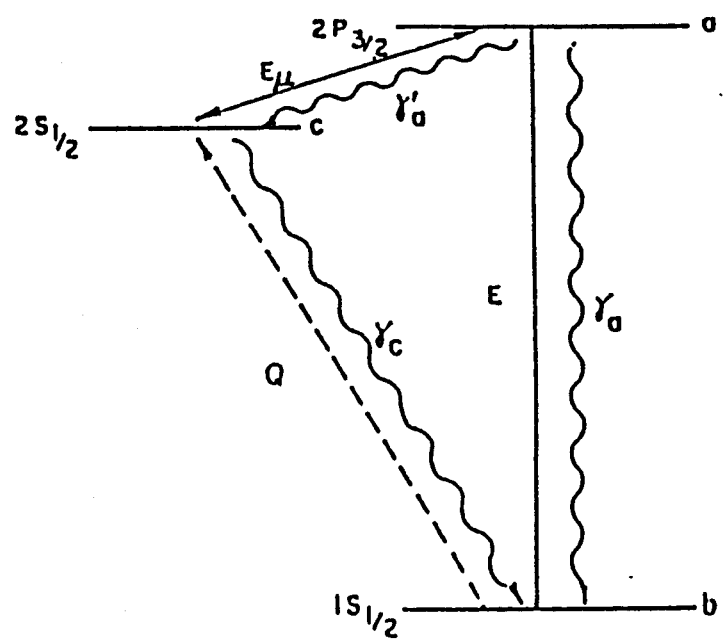
FIG. 5 is an energy level diagram of an upper level doublet with coupling between upper levels $|c|$ and $|a|$.

FIG. 5 depicts a system in which the coupling is between two upper levels, $|c\rangle$ and $|a\rangle$, and probe radiation goes with the $|b\rangle \rightarrow |a\rangle$ transition. An analysis similar to the previous examples leads to a polarization whose real and imaginary parts are large and vanishing, respectively, as depicted in FIG. 4.

FIG. 5 depicts a three level system with parodies of a, b, and c states indicated schematically to be those corresponding to a $2p_{3/2}$, $1S_{\frac{1}{2}}$, and $2S_{\frac{1}{2}}$ levels of a hydrogenic atom. The coupling between a and c is designated as Eµ and the decay between a and c is denoted by $\gamma_a$. The decay rate from the c state to the b state which is forbidden by radiation selection rules could be allowed by electron or atom collisions and likewise excitation from b to c could be obtained by the same mechanism. The electric field of the laser or optical means coupling a and b is designated by E.

A system which has been shown to yield vary small ImP along the lines of this example has been disclosed in K. Boller et al., ibid., "Electromagnetically Induced Transparency" on the $5s5p^1P_1 \rightarrow 4d5d^1D_2$ line of strontium at 337 nm.

As discussed earlier, the numerical aperture and thus the resolution can be increased by immersing the sample in a high index medium.

Figure 6:
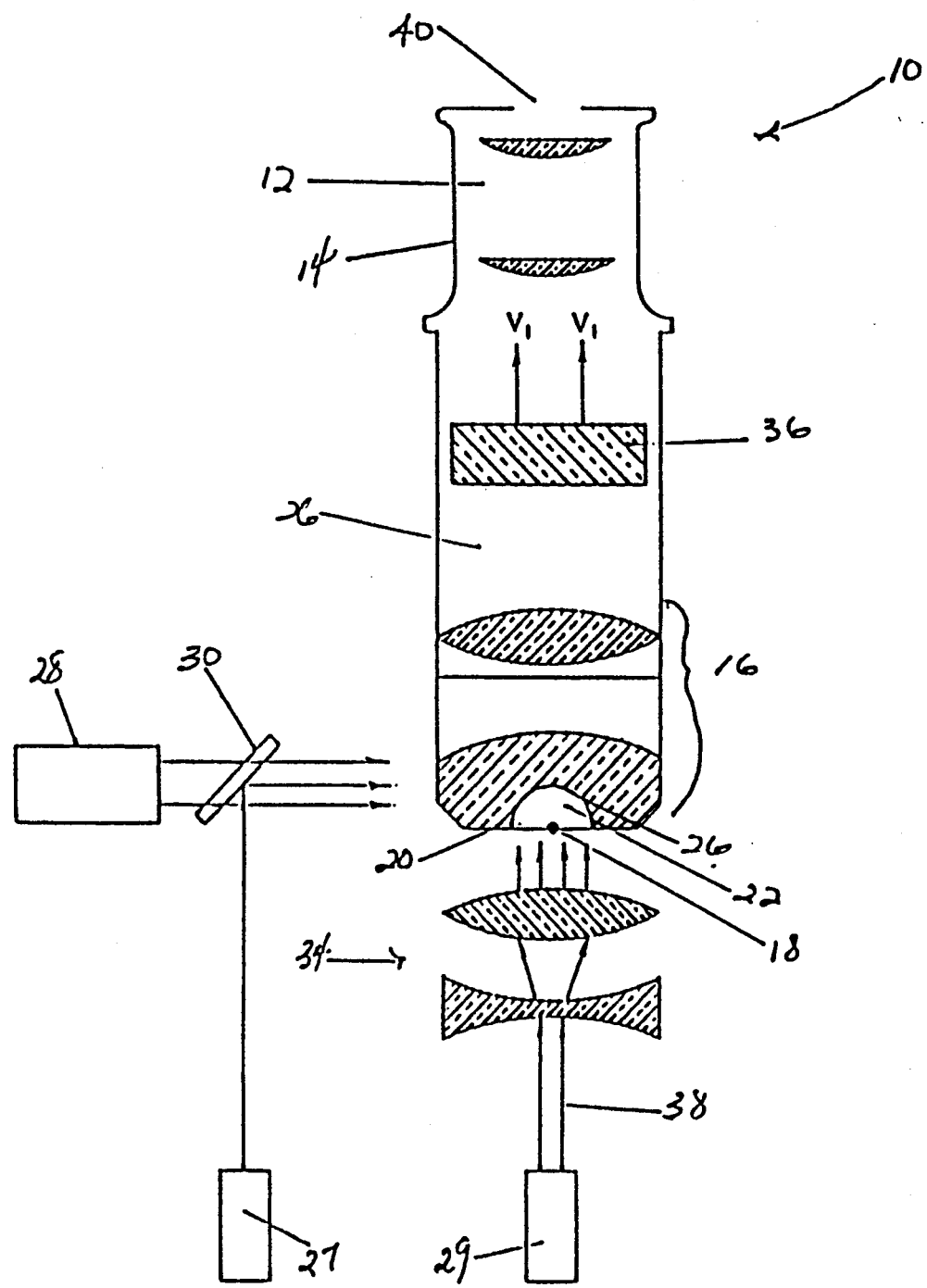
FIG. 6 is the preferred high index of refraction microscope of the invention.

FIG. 6 illustrates a preferred embodiment of the apparatus of the invention. Microscope 10 comprises eyepiece 12, barrel 14, and objective system 16. Sample or object 18 mounted upon a glass slide or the like, on stage 20, is positioned at the focal point of the lens system.

High index material 22, confined within convergent lens channel or container 24, preferably comprises rubidium (Rb) vapor, sodium (Na) vapor, carbon dioxide, or the like. Glass to air interface 26, comprises a convergent meniscus.

Channel member or container 24, in addition to confining the vapor therein, further comprises a conduit for the supersonic flow of high index of refraction gases. By limiting velocity components of the gas flow transverse to the main (atomic) flow, the effects of Doppler broadening are limited.

Further reference to FIG. 6 illustrates the various energies input to the microscope 10. Coherent light radiation at a wavelength, for example, of 1300 nm, is emitted from source 27, split by beamsplitter 30, and directed upon high index material 22. Simultaneously, pump radiation of wavelengths, for example, of 740 nm and 780 nm is emitted from source 28. Pump source 28 may comprise lasers, light emitting diodes, flash lamps, and the like.

Imaging radiation from source 29 impinges upon illumination optics 34 and thereafter objective system 16, including high index material 22 and object 18.

The effect of radiation impinging upon high index material 22 is to raise the index of refraction, n, of such material by several orders of magnitude, thereby also greatly increasing resolution of objective lens system 16 of microscope 10. Nonlinear band pass filter 36 passes imaging radiation 38 while filtering out pump and coherent radiation. The imaging radiation ultimately is directly observed at eyepiece 40, either visually or, more appropriately, by a video camera.

Those ordinarily skilled in the art will recognize that other radiation sources, for example, microwave energy or Raman-induced coherence, could be used.

FIG. 7 shows an alternative embodiment of apparatus of the invention. Photolithography or etching apparatus 50 also comprises high index of refraction material 52 flowing and enclosed within half-cylindrical channel or container 54. In this embodiment, coherence generating laser source 56 also provides laser radiation of wavelength, for example, 1300 nm. In similar manner, pump radiation source 58 provides laser radiation of wavelength 780 nm and 740 nm, respectively. Illuminating source 60 likewise provides laser radiation of wavelength 794 nm or the like.

Mirrors 62,64 direct radiation from coherence generating source 56 and pump radiation source 58, respectively, into high index of refraction material 52. Lens system 72 focuses illuminating radiation on wafer 74.

Due to the logarithmic increase in the index of refraction of high index material 52, resolution of such material is also greatly increased. Wafer 74 is accordingly etched or scribed by illuminating radiation in a much more efficient and expeditious manner than has heretofore been possible.

FIG. 8 depicts an energy level diagram in the case where rubidium (Rb) vapor comprises the high index of refraction material employed in the microscope and etching apparatus depicted in FIGS. 5 and 6, respectively.

Finally, the issue of Doppler broadening associated with a gaseous medium is addressed. In such inhomogeneously broadened systems, atoms moving with different velocity components, parallel to the direction of propagation of the light beam, will see different radiation frequencies and therefore tend to lose the conditions for high index operation. This problem can be quantified as follows.

Consider the case in which an atom moves into the laser beam with velocity v. The effective light frequency is then $$\nu = \nu_0(1+\beta)$$

where $\nu_0$ is the unshifted frequency and $\beta = v/c$. Now the detuning relations are $$\Delta_{ac} = \omega_{ac} - \nu_0(1+\beta) = \Delta_{ac}^0 - \delta,$$

$$\Delta_{bc} = \omega_{bc} - \nu_0(1+\beta) = \Delta_{bc}{}^0 - \delta,$$

Thus, one might think that Doppler broadening would negate the present effects (that is, ImP=0, but ReP large for some detuning frequencies). This is not the case. The effect persists even when Doppler broadening is several times the radiative linewidth.

Also, as noted above, for a cylindrical geometry, a gaseous medium ejected from a gas dynamic nozzle with the atoms caused to flow supersonically through the half-cylindrical space minimizes the undesirable velocity components in the direction transverse to the atomic flow. Such gas jet technologies are well developed and well known to those ordinarily skilled in the art.

As another means of minimizing the effects of Doppler broadening, one can utilize coherent pulse excitation in such a way as to select one particular velocity subgroup having a well defined velocity and therefore a well defined effective radiation frequency. This is summarized in FIGS. 6 and 7, where one sees that the radiation effecting the transition from the ground state to levels c and b, co-propagate with the radiation at frequency $\nu$, and in this way select only those atoms which have a specific velocity, thus negating inhomogeneous Doppler broadening.

In the case of the upper level doublet radiative decay coupled system, the conditions required for high n operation involve the relation:

$$\Delta_1 \sqrt{\gamma^2} \, p_2 = \Delta_2 \sqrt{\gamma_1} \, p_1$$

This can be accomplished in several ways.

In particular, when $\Delta_1 = -\Delta_2 = \Delta$ and the matrix elements and the decay rates are equal, an effective high n material is produced. In this case, as in the previous case, however, Doppler broadening must be considered. In a dressed state atomic system the excited levels are produced in a doublet configuration by an external laser radiation. As in the preceding example, a cylindrical geometry is interesting in this context as it will tend to minimize the effects of Doppler broadening. More interesting, however, is the possibility of once again using a co-propagating geometry in which the radiation producing the dressed state doublet is resonant with the transition e→a. The "working" radiation, tuned half way between the dressed state doublet, interacts only with the velocity subgroup chosen by the e→a radiation.

Finally, it is noted that in the case, $$\Delta_1 = \Delta_2, \quad 1 = -2, \quad \gamma_1 = \gamma_2,$$

the effects of Doppler broadening are unimportant. The condition $\Delta_1 = \Delta_2$ is satisfied for all velocities since $$\Delta_1 = \omega_{ac} - \nu_1\left(1 + \frac{\nu}{c}\right) = \Delta_1{}^0 + \nu_1\frac{\nu}{c}$$

and $$\Delta_2 = \omega_{bc} - \nu_2\left(1 + \frac{\nu}{c}\right) = \Delta_2{}^0 + \nu_2\frac{\nu}{c},$$

and if $\Delta_1{}^0 = \Delta_2{}^0$, while $\nu_1 = \nu_2$, the conditions for high index operation is met.

It is to be noted, however, that the present analysis has ignored decay from a→c and b→c, but has retained the decay from a→d and b→d as the major "interfering" terms. This is an approximation. Nevertheless the Doppler effects can be mitigated.

In general, a "Doppler-effect-cancellation" is evident from FIG. 9. At the zeros of ImP, the curve is steep and essentially linear, thus any average with a symmetric weighting tends to cancel out. This effect has been confirmed via numerical calculations.

In optical media involving resonant absorption, the complex polarization between energy levels $|a\rangle$ and $|b\rangle$, written in terms of the off-diagonal elements of the density matrix $\rho_{ab}$ and the dipole matrix element, $$ab = er_{ba}, \tag{1}$$

is given by:

$$P = ab\Sigma_i \rho_{ab}{}^i$$

where i is the atomic index. This relation in terms of a complex susceptibility is:

$$P = \epsilon_0(\chi' + i\chi'')E \tag{3}$$

where E is the optical field strength. The dispersive, n, and absorptive, k, parts of the index of refraction are then related to the real, $\chi'$ and imaginary, $\chi''$, components of the susceptibility by the well known relation:

$$(n+ik)^2 = 1 + \chi' + i\chi'' \tag{4}$$

In the case of the b→a transition mentioned above, the result is:

$$\chi' = \frac{|p_{ab}|^2}{\epsilon_0 \hbar} \frac{\Delta_{ab}}{\Delta_{ab}^2 + \gamma_{ab}^2} N \tag{5a}$$

$$\chi'' = \frac{|p_{ab}|^2}{\epsilon_0 \hbar} \frac{\gamma_{ab}}{\gamma_{ab}^2 + \Delta_{ab}^2} N \tag{5b}$$

where $\epsilon_0$ is the free space permittivity, n is Planck's constant, $\Delta_{ab}$ is the detuning frequency between the atomic frequency $\omega_{ab}$ and the radiation frequency $\nu$, i.e., $\Delta_{ab} = \omega_{ab} - \nu$; $\gamma_{ab}$ is the average of the decay rates from levels a and b, $\gamma_{ab} = (\gamma_a + \gamma_b)/2$; and N is the density of atoms in the lower state $|b\rangle$.

It is useful to write Equations 5a and 5b using the radiative decay rate $\gamma_n$ between levels a and b:

$$\gamma_r = \frac{|p_{ab}|^2 \nu^3}{6\pi \hbar \epsilon_0 c^3}, \tag{6}$$

in terms of which $\chi'$ becomes $$\chi'' = \frac{3\lambda^3}{8\pi^2} \frac{\gamma_r}{\gamma_{ab}} N, \tag{7a}$$

and the real part of the susceptibility, at $\Delta_{ab} = \gamma_{ab}$ may likewise be written as:

$$\chi' = \frac{3\lambda^3}{8\pi^2} \frac{\gamma_r}{\gamma_{ab}} N. \tag{7b}$$

Thus, for $\lambda \sim 5000$ Å, $\gamma_r \sim \gamma_{ab}$, and a gas at one atmosphere, $N \sim 10^{19}$ atoms/cc, $\chi' \sim 10^4$, and there is a large index of refraction.

The absorption per unit length is related to $\chi''$ by the expression:

$$\frac{dE}{dz} = -\frac{\chi''}{\lambda} E, \tag{8}$$

that is, $\chi''/\lambda$ is essentially the loss per unit wavelength. Hence, if, as in the previous example, $\chi' \sim 10^4$, the light would be totally absorbed in a small fraction of a wavelength.

Consider the case of the lower level doublet. For this problem, the slowly varying polarization amplitude, $$P = Pe^{-i\nu t}, \tag{9}$$

is given by:

$$ReP = \frac{p^2 r E_0}{h} \left\{ \left[ \frac{1}{\gamma_{ab}^2 + \Delta_{ab}^2} \left( \Delta_{ab} \left( \frac{\rho_{aa}^0}{\gamma_a} - \frac{\rho_{bb}^0}{\gamma_b} \right) - \frac{|\rho_{bc}^0|}{\sqrt{\gamma_{bc}^2 + \omega_{bc}^2}} (\Delta_{ab}\cos\phi + \gamma_{ab}\sin\phi) \right) \right] + \right. \tag{10a}$$

$$\left. \left[ \frac{1}{\gamma_{ac}^2 + \Delta_{ac}^2} \left( \Delta_{ac} \left( \frac{\rho_{aa}^0}{\gamma_a} - \frac{\rho_{cc}^0}{\gamma_c} \right) - \frac{|\rho_{bc}^0|}{\sqrt{\gamma_{bc}^2 + \omega_{bc}^2}} (\Delta_{ac}\cos\phi - \gamma_{ac}\sin\phi) \right) \right] \right\}$$

$$ImP = \frac{p^2 r E}{h} \left\{ \left[ \frac{1}{\gamma_{ab}^2 + \Delta_{ab}^2} \left( \gamma_{ab} \left( \frac{\rho_{aa}^0}{\gamma_a} - \frac{\rho_{bb}^0}{\gamma_b} \right) - \frac{|\rho_{bc}^0|}{\sqrt{\gamma_{bc}^2 + \omega_{bc}^2}} (\gamma_{ab}\cos\phi - \Delta_{ab}\sin\phi) \right) \right] + \right. \tag{10b}$$

$$\left. \left[ \frac{1}{\gamma_{ac}^2 + \Delta_{ac}^2} \left( \gamma_{ac} \left( \frac{\rho_{aa}^0}{\gamma_a} - \frac{\rho_{cc}^0}{\gamma_c} \right) - \frac{|\rho_{bc}^0|}{\sqrt{\gamma_{bc}^2 + \omega_{bc}^2}} (\gamma_{ac}\cos\phi - \Delta_{ac}\sin\phi) \right) \right] \right\}$$

where the phase angle is defined by $$\phi = \frac{\rho_{bc}^0}{\gamma_{bc} + i\omega_{bc}} = \frac{|\rho_{bc}^0|e^{i\phi}}{\sqrt{\gamma_{bc}^2 + \omega_{bc}^2}}. \tag{11}$$

For simplicity, it is here assumed that $_{ab} = _{cb} = $ . In Equations 10a and 10b, r is the atomic excitation rate per unit volume, $E_0$ is the electric field amplitude of the radiation field, n is Planck's constant, $\gamma_{\alpha,\beta}$ is the average decay from the levels $\alpha$ and $\beta$ defined by $\gamma_{\alpha,\beta} = (\gamma_\alpha + \gamma_\beta)/2$, $\Delta_{\alpha,\beta} = \omega_{\alpha,\beta} - \nu$, where $\omega_{\alpha,\beta}$ is the transition frequency between levels $\alpha$ and $\beta$, $\nu$ is the radiation frequency, and $\rho_{\alpha,\beta}^0$ is the density matrix element, e.g., $\rho_{\alpha,\alpha}^0$ is the initial probability of being in the $\alpha$th level.

Equations 10a and 10b indicate that it is possible to make the absorption (ImP) vanish while maintaining the refractive index (ReP). As an example, consider the case in which one tunes the transition so as to vary the detuning frequencies $\Delta_{ab}$ and $\Delta_{ac}$, subject to the constraint $\Delta_{ac} - \Delta_{ab} = \omega_{bc}$. For simplicity, consider the case $\gamma_a = \gamma_b = \gamma_c = \gamma_{ab} = \gamma_{ac} = \gamma$, that is, a collision broadened limit of operation. Finally, when pumping levels b and c coherently so that $\phi = 5\pi/4$, and $\rho_{bb} = \rho_{cc} = |\rho_{bc}|$, then Equations 10a and 10b become $$ReP = \frac{p^2 r E_0}{h} \left\{ \frac{1}{\gamma^2 + \left(\Delta - \frac{\gamma}{2}\right)^2} \left[ \left(\frac{\Delta}{\gamma} - \frac{1}{2}\right)\rho_{aa}^0 - \left(\frac{\Delta}{2\gamma} - \frac{3}{4}\right)\rho_{bb}^0 \right] + \right. \tag{12}$$

$$\left. \frac{1}{\gamma^2 + \left(\Delta + \frac{\gamma}{2}\right)^2} \left[ \left(\frac{\Delta}{\gamma} + \frac{1}{2}\right)\rho_{aa}^0 - \left(\frac{\Delta}{2\gamma} + \frac{3}{4}\right)\rho_{bb}^0 \right] \right\}$$

$$ImP = \tag{13}$$
$$\frac{p^2 r E_0}{h} \left\{ \frac{1}{\gamma^2 + \left(\Delta - \frac{\gamma}{2}\right)^2} \left[ \rho_{aa}^0 - \left(\frac{\Delta}{2\gamma} - \frac{1}{4}\right)\rho_{bb}^0 \right] + \right.$$

$$\left. \frac{1}{\gamma^2 + \left(\Delta + \frac{\gamma}{2}\right)^2} \left[ \rho_{aa}^0 - \left(\frac{\Delta}{2\gamma} - \frac{1}{4}\right)\rho_{bb}^0 \right] \right\}$$

For example, at the detuning frequency $\delta \approx 1.1\gamma$ and for the case $\rho_{aa} = 0.2$, $\rho_{bb} = \rho_{cc} = 0.4$:

$$ImP = 0 \tag{14}$$

while ReP is of order $$ReP = \frac{p^2 N E_0}{h \gamma}, \tag{15}$$

where:

$$N = \frac{r}{\gamma}, \tag{16}$$

resulting in a large dispersion:

$$\chi' = \frac{ReP}{\epsilon_0 E} \approx \frac{p^2 N}{\hbar \epsilon_0 \gamma}, \quad (17)$$

which may also be written as:

$$\chi' = \frac{3\lambda^3}{8\pi^2} \frac{\gamma_r}{\gamma_b} N. \quad (18)$$

This is the desired result: large dispersion and no absorption. The results of this section are summarized in FIG. 2 for the case in which $$\gamma_a = 0.1\gamma, \gamma_b = \gamma_c = \gamma. \quad (19)$$

In the case of an excited state upper level doublet, each of the upper levels decays to the same level. This is an example of radiative decay coupling.

The real and imaginary parts of the polarization are given by:

$$ReP = -\frac{NE}{\hbar D^*D} \{\Delta_1\Delta_2(\Delta_1 p_2^* p_2 + \Delta_2 p_1^* p_1) + (\Delta_1\gamma_2 + \Delta_2\gamma_1) \times \quad (20a)$$

$$[\gamma_1 p_2^* p_2 + \gamma_2 p_1^* p_1 - \sqrt{\gamma_1\gamma_2}(p_1^* p_2 + p_2^* p_1)]\}$$

$$ImP = \frac{NE}{\hbar DD^*} \{(\Delta_1\gamma_2 + \Delta_2\gamma_1)(\Delta_1 p_2^* p_2 + \Delta_2 p_1^* p_1) - \quad (20b)$$

$$\Delta_1\Delta_2[\gamma_1 p_2^* p_2 + \gamma_2 p_1^* p_1 - \sqrt{\gamma_1\gamma_2}(p_1^* p_2 + p_2^* p_1)]\}$$

where $D = -\Delta_1\Delta_2 + i(\Delta_1(\gamma_2 + \Delta_2\Gamma_1))$, $\Delta_1 = \omega_{ac} - \nu$, $\Delta_2 = \omega_{bc} - \nu$; $\gamma_1, \gamma_2$ and $_1, _2$ are the radiative decay rates from levels a and b and the transition matrix elements from a→c and b→c, respectively.

Equation (20b) can be further simplified as $$ImP = \frac{NE}{\hbar D^*D} \{(\Delta_1^2 \gamma_2 p_2^* p_2 + \Delta_2^2 \gamma_1 p_1^* p_1) + \quad (21)$$

$$\Delta_1\Delta_2\sqrt{\gamma_1\gamma_2}(p_1^* p_2 + p_2^* p_1)\}$$

$$= \frac{NE}{\hbar DD^*}[\Delta_1\sqrt{\gamma_2} p_2^* + \Delta_2\sqrt{\gamma_1} p_1^*][\Delta_1\sqrt{\gamma_2} p_2 + \Delta_2\sqrt{\gamma_1} p_1)]$$

which vanishes if:

$$\Delta_1\sqrt{\gamma_2} p_2 = -\Delta_2\sqrt{\gamma_1} p_1. \quad (22)$$

Assuming for the moment that $_i$ is the real and substituting (22) into (20a) yields:

$$ReP = \frac{NE}{\hbar D^*D} \left[\Delta_1^2 p_2^2 \sqrt{\frac{\gamma_2}{\gamma_1}} + \quad (23)\right.$$

$$\left.\gamma_1^2 p_1^2 \left(\frac{p_2}{p_1} - \sqrt{\frac{\gamma_2}{\gamma_1}}\right)\right]\left(\frac{p_2}{p_1} - \sqrt{\frac{\gamma_2}{\gamma_1}}\right)$$

and if it is assumed that $\gamma_1 = \gamma_2$ and $_2 = 2 _1$, then:

$$ReP \approx \frac{NEp_1^2}{\hbar \Delta_1}, \quad (24)$$

which clearly implies a large index of refraction when $\Delta_1 \approx \Gamma$.

Another interesting limit is that in which:

$$\Delta_1 = \Delta_2 = \Delta \quad (25)$$

$$_1 = -, _2 = , \quad (26)$$

$$\gamma_1 = \gamma_2. \quad (27)$$

Under conditions (25), (26) and (27), where IMP=0, the real part of Equation 20a now reads:

$$ReP = -\frac{N(p^*p/\hbar)}{\Delta^4 + 4\Delta^2\gamma^2}(\Delta^3 + 2\Delta^2\gamma + 2\Delta\gamma^2). \quad (28)$$

The result in this example is a polarization which is purely real.

It is noted that for the detuning frequency $\Delta = \gamma$, Equation 21 yields $$\chi' = \frac{Re(p_1^* \rho_{ac} + p_2^* \rho_{bc})}{\epsilon_0 E} = -\frac{Np^*p}{\epsilon_0 \hbar \gamma}, \quad (29)$$

which is the resonant dispersion as given by Equation 5b. Thus, in this case, as in the previous case, it is possible to have a resonant ultra-refractive medium with no absorption.

Finally it is emphasized that the population in the excited |a> state should be in the neighborhood of a few torr, i.e., $N \approx 10^{16}$ cm$^{-3}$. This could be accomplished by pulsed excitation accompanied by, e.g., Raman induced coherence. In such a mode of operation, the excitation and coherence (e.g., Raman) inducing preparation pulses would precede the probe of imaging pulse. Working in the subnanosecond or picosecond region, the preparation pulses would be followed by the imaging pulse in a time short compared to the atomic lifetimes and dephasing times. The preparation-image sequence could then be repeated many times.

Finally, the problem of electromagnetically induced transparency, which can also show the ultra-refractive medium effect, is considered. In this case:

$$ReP = \frac{|g_{ab}|^2}{Z}\left\{\left[-(\Delta_1 - \Delta_2)(\rho_{aa} - \rho_{bb}) + \quad (30a)\right.\right.$$

$$\left.\frac{\Delta_2|\Omega_\mu|^2}{\Delta_2^2 + \gamma_{ac}^2}(\rho_{aa} - \rho_{cc})\right] \times [\gamma_{ab}\gamma_{cb} - \Delta_1(\Delta_1 - \Delta_2) +$$

$$|\Omega_\mu|^2] + \left[\gamma_{cb}(\rho_{aa} - \rho_{bb}) - \frac{\gamma_{ac}|\Omega_\mu|^2}{\Delta_2^2 + \gamma_{ac}^2}(\rho_{aa} - \rho_{cc})\right] \times$$

$$\left.[\gamma_{cb}\Delta_1 + \gamma_{ab}(\Delta_1 - \Delta_2]\right\}$$

-continued $$ImP = \frac{|g_{ab}|^2}{Z} \Biggl\{ \Biggl[ \gamma_{cb}(\rho_{aa} - \rho_{bb}) - \frac{\gamma_{ac}|\Omega_\mu|^2}{\Delta_2^2 + \gamma_{ac}^2}(\rho_{aa} - \rho_{cc}) \Biggr] \times [\gamma_{ab}\gamma_{cb} - \Delta_1(\Delta_1 - \Delta_2) + |\Omega_\mu|^2] + \Biggl[ (\Delta_1 - \Delta_2)(\rho_{aa} - \rho_{bb}) - \frac{\Delta_2|\Omega_\mu|^2}{\Delta_2^2 + \gamma_{ac}^2}(\rho_{aa} - \rho_{cc}) \Biggr] \times [\gamma_{cb}\Delta_1 + \gamma_{ac}(\Delta_1 - \Delta_2)] \Biggr\}$$ (30b)

where $$Z = [\gamma_{ab}\gamma_{cb} - \Delta_1(\Delta_1 - \Delta_2) + |\Omega_\mu|^2]^2 + [\gamma_{cb}\Delta_1 = \gamma_{ab}(\Delta_1 - \Delta_2)]^2$$ (31a)

$$\gamma_{ab} = \frac{\gamma_a + \gamma_a'}{2} + \frac{Q}{2},$$ (31b)

$$\gamma_{ac} = \frac{\gamma_a + \gamma_a'}{2} + \frac{\gamma_c}{2},$$ (31c)

$$\gamma_{bc} = \frac{\gamma_c}{2} + \frac{Q}{2},$$ (31d)

$$\Delta_1 = \omega_{ab} - \nu_1,$$ (31e)

$$\Delta_2 = \omega_{ac} - \nu_\mu,$$ (31f)

$$\Omega_\mu = \rho_{ac}E_\mu/h$$ (31g)

$$\rho_{aa} = \frac{1}{z_1} 2|\Omega_\mu|^2 Q$$ (31h)

$$\rho_{cc} = \frac{1}{z_1}[(\gamma_a + \gamma_a') + 2Q|\Omega_\mu|^2]$$ (31i)

$$\rho_{bb} = \frac{1}{z_1}[\gamma_c(\gamma_a + \gamma_a') + 2(\gamma_a + \gamma_c)|\Omega_\mu|^2]$$ (31j)

$$z_1 = \gamma_c(\gamma_a + \gamma_a') + 2(\gamma_a + \gamma_c)|\Omega_\mu|^2 + (\gamma_a + \gamma_a') + Q + 4Q|\Omega_\mu|^2$$ (31k)

$$= \gamma_{ac}[\gamma_{ac}^2 + \Delta_2^2]^{-1}$$ (31l)

The polarization, Equations 30a and 30b, is clearly rather complicated, however there are many variable parameters and it is clear that there are many choices of detuning frequencies, $\Delta_1, \Delta_2$, pump strengths Q, and the like, which lead to the desired result IMP=0 and ReP large, as in the previous examples.

The preceding examples can be repeated with similar success by substituting the generically or specifically described reactants and/or operating conditions of this invention for those used in the preceding examples.

Although the invention has been described with reference to these preferred embodiments, other embodiments can achieve the same results. Variations and modifications of the present invention will be obvious to those skilled in the art and it is intended to cover in the appended claims all such modifications and equivalents. The entire disclosures of all applications, patents, and publications cited above, and of the corresponding application are hereby incorporated by reference.

What is claimed is:

1. A method of making a material having a high index of refraction comprising the steps of:
    a. irradiating a composition of matter with a coupling radiation and thereby establishing atomic phase coherence between various energy levels of the composition of matter;
    b. minimizing absorbance of the composition of matter; and
    c. irradiating the composition of matter with a probe frequency which is responsive to and affected by a high index of refraction material which is generated by atomic phase coherence.

2. The method of claim 1 wherein the step of irradiating the composition of matter with a coupling radiation and thereby establishing atomic phase coherence between various energy levels of the composition of matter comprises illuminating the composition of matter with resonant laser radiation.

3. The method of claim 1 wherein the steps of irradiating the composition of matter with a coupling radiation and thereby establishing atomic phase coherence between the various energy levels of the composition of matter comprises providing a microwave driving field to the composition of matter.

4. The method of claim 1 wherein the step of irradiating the composition of matter with a coupling radiation and thereby establishing atomic phase coherence between various energy levels of the composition of matter comprises providing Raman-induced coherence.

5. The method of claim 1 wherein the step of minimizing the absorbance of the composition of matter comprises selecting a detuning frequency of the coupling radiation between the probe frequency and the atomic phase coherence.

6. The method of claim 1 further comprising the step of observing an object within the high index of refraction material.

7. The method of claim 1 further comprising the step of etching an object within the high index of refraction material.

8. Apparatus for etching semiconductor wafers and the like comprising:
    photolithography means comprising support means for supporting a semiconductor wafer to be etched, said support means further supporting means containing high index of refraction material; and
    means for irradiating said high index of refraction material, whereby the index of refraction of said high index of refraction material is increased by several orders of magnitude.

9. The invention of claim 8 wherein said means containing said high index of refraction material comprises conduit means.

10. The invention of claim 9 wherein said conduit means is semi-cylindrical.

11. The invention of claim 9 wherein said high index of refraction material flows through said conduit means.

12. The invention of claim 8 wherein said means for irradiating said high index of refraction material comprises excitation pump radiation means to atoms comprising high index of refraction material.

13. The invention of claim 8 wherein said means for irradiating said high index of refraction material comprises coherence radiation generating means.

14. The invention of claim 8 wherein said means for irradiating said high index of refraction material comprises illuminating radiation means.

15. The invention of claim 8 wherein said high index of refraction material comprises at least one material selected from the group consisting of rubidium (Rb) vapor, sodium (Na) vapor, and carbon dioxide.

16. A method of etching semiconductor material comprising the steps of:
   a. providing a conduit over an area to be etched;
   b. positioning high index of refraction material within the conduit; and
   c. irradiating the high index of refraction material while focusing illuminating radiation upon the area to be etched.

17. The method of claim 16 wherein the step of positioning high index of refraction material within the conduit comprises flowing the high index of refraction material through the conduit.

18. The method of claim 16 wherein the step of irradiating the high index of refraction material comprises directing a plurality of excitation pump radiation beams upon the high index of refraction material.

19. The method of claim 16 wherein the step of irradiating the high index of refraction material comprises directing coherent radiation upon the high index of refraction material.

* * * * *